(12) United States Patent
Zhou et al.

(10) Patent No.: US 11,502,768 B2
(45) Date of Patent: *Nov. 15, 2022

(54) METHOD AND DEVICE FOR CONFIGURING AND RECEIVING COMMON CONTROL CHANNEL

(71) Applicant: SPREADTRUM COMMUNICATIONS (SHANGHAI) CO., LTD., Shanghai (CN)

(72) Inventors: Huayu Zhou, Shanghai (CN); Yanan Jia, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 203 days.

This patent is subject to a terminal disclaimer.

(21) Appl. No.: 16/918,270

(22) Filed: Jul. 1, 2020

(65) Prior Publication Data
US 2020/0336236 A1    Oct. 22, 2020

Related U.S. Application Data

(62) Division of application No. 15/926,209, filed on Mar. 20, 2018, now Pat. No. 10,742,346.

(51) Int. Cl.
*H04J 11/00* (2006.01)
*H04L 5/00* (2006.01)
(Continued)

(52) U.S. Cl.
CPC ....... *H04J 11/0073* (2013.01); *H04J 11/0076* (2013.01); *H04L 5/005* (2013.01);
(Continued)

(58) Field of Classification Search
CPC ... H04J 11/0073; H04J 11/0076; H04L 5/005; H04L 5/0053; H04L 27/2611; H04W 48/12
See application file for complete search history.

(56) References Cited

U.S. PATENT DOCUMENTS

| | | | |
|---|---|---|---|
| 2011/0274031 | A1 | 11/2011 | Gaal et al. |
| 2015/0124688 | A1 | 5/2015 | Xu et al. |

(Continued)

FOREIGN PATENT DOCUMENTS

| | | | |
|---|---|---|---|
| CN | 101155167 | A | 4/2008 |
| CN | 103402251 | A | 11/2013 |
| CN | 105940616 | A | 9/2016 |

OTHER PUBLICATIONS

U.S. Non-Final Office Action for U.S. Appl. No. 15/926,209, dated Oct. 30, 2019.
(Continued)

*Primary Examiner* — Melanie Jagannathan
(74) *Attorney, Agent, or Firm* — Cantor Colburn LLP

(57) ABSTRACT

The present disclosure provides a method for configuring and receiving a common control channel, and a device for configuring and receiving a common control channel. The method for configuring a common control channel includes: configuring a common control channel and a primary synchronization signal and/or a secondary synchronization signal in a subband where a user equipment resides in a frequency division multiplexing manner; and transmitting the common control channel by using configured resources. Embodiments of the present disclosure may improve resource utilization by configuring the common control channel.

19 Claims, 6 Drawing Sheets

--- configuring a common control channel and a primary synchronization signal and/or a secondary synchronization signal in a subband where a user equipment resides in a frequency division multiplexing manner — S101 transmitting the common control channel by using configured resources — S102

(51) Int. Cl.
*H04W 48/12* (2009.01)
*H04L 27/26* (2006.01)

(52) U.S. Cl.
CPC ......... *H04L 5/0053* (2013.01); *H04J 11/0086* (2013.01); *H04L 27/2611* (2013.01); *H04W 48/12* (2013.01)

(56) References Cited

U.S. PATENT DOCUMENTS

| | | | |
|---|---|---|---|
| 2015/0327224 A1 | 11/2015 | Guan et al. | |
| 2016/0014778 A1* | 1/2016 | Zhou | H04L 41/0803 370/252 |
| 2016/0164653 A1* | 6/2016 | Wang | H04W 72/042 370/329 |
| 2016/0218847 A1* | 7/2016 | Zheng | H04L 41/0806 |
| 2018/0007709 A1 | 1/2018 | Seo et al. | |
| 2018/0076924 A1* | 3/2018 | Lee | H04W 72/042 |
| 2018/0192383 A1* | 7/2018 | Nam | H04W 56/001 |
| 2018/0198648 A1* | 7/2018 | Sun | H04L 27/2613 |
| 2018/0262977 A1* | 9/2018 | Lee | H04W 48/16 |
| 2018/0270713 A1* | 9/2018 | Park | H04L 5/0053 |
| 2018/0270791 A1* | 9/2018 | Park | H04W 76/27 |
| 2018/0343043 A1 | 11/2018 | Hakola et al. | |
| 2019/0045377 A1* | 2/2019 | Kakishima | H04W 48/16 |
| 2019/0132029 A1 | 5/2019 | Sun et al. | |
| 2019/0230696 A1* | 7/2019 | Kim | H04W 72/1278 |
| 2021/0298017 A1* | 9/2021 | Shimezawa | H04W 72/04 |

OTHER PUBLICATIONS

3GPP TSG RAN Wg1 Meeting #87, "Common control signaling for NR", Agenda Item: 7.1.4.1; dated Nov. 18, 2016.

CNIPA First Office Action for corresponding Patent Application No. CN201710182864.3 dated Jun. 1, 2020.

NEC; "Principles of L1/L2 Control Channel Design for NR", 3GPP TSG-RAN WG1 Meeting #86Bis, Agenda Item: 3.1.7.1; dated Oct. 10-14, 2016; 3 pages.

Huawei, HiSilicon; "Time and frequency resources for DL control channels", 3GPP TSG RAN Wg1 Meeting #87, Agenda Item: 7.1.4.1; Reno, USA, Nov. 14-18, 2016; 3 pages.

CNIPA Second Office Action for corresponding CN Application No. 201710182864.3, dated Jan. 7, 2021.

* cited by examiner

METHOD AND DEVICE FOR CONFIGURING AND RECEIVING COMMON CONTROL CHANNEL

CROSS-REFERENCE TO RELATED APPLICATIONS

This application is a Divisional Application of the U.S. patent application Ser. No. 15/926,209 filed on Mar. 20, 2018 and which claims the benefit of priority to Chinese Patent Application No. 201710182864.3, filed on Mar. 24, 2017, the entire disclosure of which are incorporated herein by reference.

TECHNICAL FIELD

The present disclosure relates to the field of communication technology, and more particularly, to a method and a device for configuring and receiving a common control channel.

BACKGROUND

In a 5th generation mobile network system (5th-Generation, 5G), a primary synchronization signal (PSS), a secondary synchronization signal (SSS) and a physical broadcast channel (PBCH) are included in a synchronization signal and PBCH block (SS/PBCH block). Each SS/PBCH block may be seen as resources of a beam in a beam sweeping process. A plurality of SS/PBCH blocks constitute a synchronization signal burst (SS-burst). The synchronization signal burst may be seen as a block of relatively concentrated resources. A plurality of synchronization signal bursts constitute a synchronization signal burst set (SS-burst-set). The beam sweeping process is repeatedly transmitting the SS/PBCH block on different beams. Based on the training of the beam sweeping, a user equipment may perceive in which beam the strongest signal is received. In addition to the PSS/SSS/PBCH being sent to the user equipment in the form of broadcast, there are other information being sent to the user equipment in the form of broadcast, such as remaining minimum system information (RMSI), paging and time slot structure, which are common control messages.

In a 5G system, in order to solve the coverage problem at a high frequency band, a broadcast type of transmission generally adopts a way of beam sweeping. If different signals and channels adopt different beam sweeping timings, beam sweeping timings will be much more, causing that the system needs to design a larger number of downlink symbols, which increases a latency of a hybrid automatic repeat request (HARQ) feedback, and increases complexity of system design. Accordingly, one way is a common control message transmission multiplexing the beam sweeping timing for the SS/PBCH block. Specially, the RMSI and the paging conduct frequency division multiplexing with the SS/PBCH block, and when the SS/PBCH block completes one round of beam sweeping, the RMSI and the paging also complete one round of beam sweeping. In general, through a physical downlink control channel (PDCCH), a network schedules the user equipment to receive the RMSI and the paging messages on a physical downlink shared channel (PDSCH). Scheduling information in the PDCCH is also referred to as RMSI downlink control information (DCI) and paging DCI.

Accordingly, there is a need for a design of the common control channel, to achieve relatively high resource utilization.

SUMMARY

Embodiments of the present disclosure provide a method and a device for configuring a common control channel, to improve resource utilization.

In an embodiment of the present disclosure, a method for configuring a common control channel is provided, including:

configuring a common control channel and a primary synchronization signal and/or a secondary synchronization signal in a subband where a user equipment resides in a frequency division multiplexing manner; and transmitting the common control channel by using configured resources.

In some embodiment, configuring the common control channel and the primary synchronization signal and/or the secondary synchronization signal in the subband where the user equipment resides in the frequency division multiplexing manner includes: in a frequency domain, the common control channel occupying at least a portion of frequency domain resources other than frequency domain resources occupied by a SS/PBCH block in the subband, wherein the SS/PBCH block includes the primary synchronization signal and the secondary synchronization signal.

In some embodiment, configuring the common control channel and the primary synchronization signal and/or the secondary synchronization signal in the subband where the user equipment resides includes: in the frequency domain, the common control channel occupying at least a portion of frequency domain resources other than frequency domain resources occupied by the primary synchronization signal and the secondary synchronization signal.

In some embodiment, the common control channel is included in the SS/PBCH block.

In some embodiment, configuring the common control channel and the primary synchronization signal and/or the secondary synchronization signal in the subband where the user equipment resides in the frequency division multiplexing manner includes: in a time domain, configuring the common control channel to occupy a first symbol or the first symbol and a second symbol occupied by the primary synchronization signal and the secondary synchronization signal.

In some embodiment, the method for configuring the common control channel further includes: configuring the common control channel and the SS/PBCH block in the subband where the user equipment resides in a frequency division multiplexing manner.

In some embodiment, the method for configuring the common control channel further includes: configuring the common control channel and the SS/PBCH block in the subband where the user equipment resides in a time division multiplexing manner.

In some embodiment, the method for configuring the common control channel further includes: configuring a mini-slot for the user equipment, wherein a number of symbols occupied by the mini-slot is a number of symbols occupied by the SS/PBCH block, and a beam used by the mini-slot is a beam used by the SS/PBCH block.

In some embodiment, the method for configuring the common control channel further includes: in scheduling information transmitted by the common control channel, indicating a location of a physical resource block occupied by a common control message bearer channel, or indicating an index of a resource block group occupied by the common control message bearer channel.

In some embodiment, the method for configuring the common control channel further includes: in scheduling information transmitted by the common control channel, indicating a location of the physical resource block occupied by user equipment dedicated data, or indicating an index of a resource block group occupied by the user equipment dedicated data.

In some embodiment, the method for configuring the common control channel further includes: configuring a demodulation reference signal of the common control channel for time and frequency synchronization of the user equipment.

In some embodiment, the method for configuring the common control channel further includes: configuring an initial value of a pseudorandom sequence for the demodulation reference signal according to a cell identity and a synchronization beam identity, to cause an interference randomization among the demodulation reference signals between different cells or different synchronization beams.

In some embodiment, the user equipment conducts a frequency domain autocorrelation on a channel estimated according to the demodulation reference signal, to obtain time synchronization; and conducts a time domain autocorrelation on the channel estimated according to the demodulation reference signal, to obtain frequency synchronization.

In some embodiments, the method for configuring the common control channel further includes: when the user equipment transmits and receives data in different subbands, configuring different patterns of reference signals for the user equipment according to a numerology of different subbands, and wherein the different patterns of reference signals at least includes different pseudorandom sequences or different time-frequency resource locations; and notifying the user equipment of the different patterns of the demodulation reference signal using an RRC signaling.

In some embodiment, the method for configuring the common control channel further includes: configuring the demodulation reference signal of the common control channel for beam training of the user equipment, to obtain a reference signal receiving power for a synchronization signal beam.

In some embodiment, configuring the demodulation reference signal of the common control channel for beam training includes: configuring a plurality of subdivided beams in each synchronization signal beam to correspond to a plurality of ports of the demodulation reference signal, such that the user equipment measures the demodulation reference signal of the plurality of ports, to obtain the reference signal receiving power of the subdivided beams and the reference signal receiving power of the synchronization signal beam.

In some embodiment, the user equipment averages the measured reference signal receiving power of the subdivided beams corresponding to the plurality of ports, to obtain the reference signal receiving power of the synchronization signal beam.

In some embodiment, prior to configuring the plurality of subdivided beams in each synchronization signal beam to correspond to the plurality of ports of the demodulation reference signal, the method further includes: notifying a number of the plurality of ports to the user equipment in a physical broadcast channel.

In some embodiment, when the reference signal receiving power of the synchronization signal beam is lower than a predetermined power threshold, the user equipment conducts beam training again.

In some embodiment, the method for configuring the common control channel further includes: configuring the user equipment to conduct monitoring of the demodulation reference signal for at least a portion of frequency in the subband.

In some embodiment, the method for configuring the common control channel further includes: configuring each port of the demodulation reference signal of the common control channel to correspond to a plurality of adjacent subcarriers.

In some embodiment, a particular subcarrier right corresponding to the port and two adjacent subcarriers of the particular subcarrier on the common control channel constitute a subcarrier group, and one physical resource block includes four subcarrier groups, and corresponds to four ports of the demodulation reference signal.

In some embodiment, the method for configuring the common control channel further includes: configuring a quasi-co-location placement port for an antenna of the demodulation reference signal of the common control channel and an antenna of a channel state information reference signal, or configuring a quasi-co-location placement for the antenna of the demodulation reference signal of the common control channel and the antenna of the channel state information reference signal.

In an embodiment of the present disclosure further, a device for configuring a common control channel is further provided, including: a common channel configuration circuitry, configured to configure the common control channel and a primary synchronization signal and/or a secondary synchronization signal in a subband where a user equipment resides in a frequency division multiplexing manner; and a transmission circuitry, configured to transmit the common control channel by using configured resources.

In an embodiment of the present disclosure, a method for receiving a common control channel is further provided, including: receiving a common control channel by configured resources, wherein the common control channel conducts frequency division multiplexing with a primary synchronization signal and/or a secondary synchronization signal in a subband where a user equipment resides.

In an embodiment of the present disclosure, a solution on a device for receiving a common control channel is further provided, the device for receiving a common control channel includes: a common control channel receiving circuitry, configured to receive the common control channel by configured resources, wherein the common control channel conducting a frequency division multiplexing manner with a primary synchronization signal and/or a secondary synchronization signal in a subband where a user equipment resides.

Compared with the prior art, embodiments of the present disclosure have the following benefits.

In embodiments of the present disclosure, a common control channel and a primary synchronization signal and/or a secondary synchronization signal are configured in a subband where a user equipment resides in a frequency division multiplexing manner; and the common control channel is transmitted using configured resources. In embodiments of the present disclosure, a common control channel and a primary synchronization signal and/or a secondary synchronization signal are configured in a frequency division multiplexing manner, thereby transmitting the common control channel and the primary synchronization signal and/or the secondary synchronization signal on the same symbols (or, time resources), to achieve relatively high resource utilization. In this way, beam sweeping timings, latency of HARQ feedback, and complexity of system design may be reduced.

Further, the common control channel and the SS/PBCH block are configured in the subband where the user equipment resides in a frequency division multiplexing manner; or, the common control channel and the SS/PBCH block are configured in the subband where the user equipment resides in a time division multiplexing manner. In embodiments of the present disclosure, a common control channel and a synchronization signal are configured to conduct the frequency division multiplexing or the time division multiplexing, thereby improving flexibility of the configuration of the common control message. Further, resource utilization of a subband resource where the user equipment resides may be improved, and complexity of system design may be reduced.

Further, a demodulation reference signal of the common control channel is configured for time and frequency synchronization of the user equipment; and the demodulation reference signal of the common control channel is configured for beam training, to obtain a reference signal receiving power for a synchronization signal beam. In embodiments of the present disclosure, a demodulation reference signal of the common control channel is configured so as to have various uses, to further improve resource utilization.

DETAILED DESCRIPTION

As described in the background, there is a need for design of a common control channel, to achieve relatively high resource utilization.

In embodiments of the present disclosure, a common control channel and a primary synchronization signal and/or a secondary synchronization signal are configured in a frequency division multiplexing manner, thereby transmitting the common control channel and the primary synchronization signal and/or the secondary synchronization signal on the same symbols (or, time resources), to achieve relatively high resource utilization. In this way, beam sweeping timings, latency of HARQ feedback, and complexity of system design may be reduced.

In embodiments of the present disclosure, a common control channel and a synchronization signal are configured to conduct the frequency division multiplexing or the time division multiplexing, thereby improving flexibility of the configuration of the common control message. Further, resource utilization of a subband resource where the user equipment resides may be improved, and complexity of system design may be reduced.

In embodiments of the present disclosure, a demodulation reference signal of the common control channel is configured so as to have various uses, to further improve resource utilization.

In order to clarify the object, characteristic and advantages of embodiments of the present disclosure, embodiments of present disclosure will be described clearly in detail in conjunction with accompanying drawings.

In some embodiment, a channel for scheduling a common control message is referred to as a common control channel or a search space, and a channel for bearing the common control message is also referred to as a common control message bearer channel. The common control channel and the common control message are broadcasted to all user equipment, and all user equipments include the user equipment in an idle state or a connected state.

Figure 1:
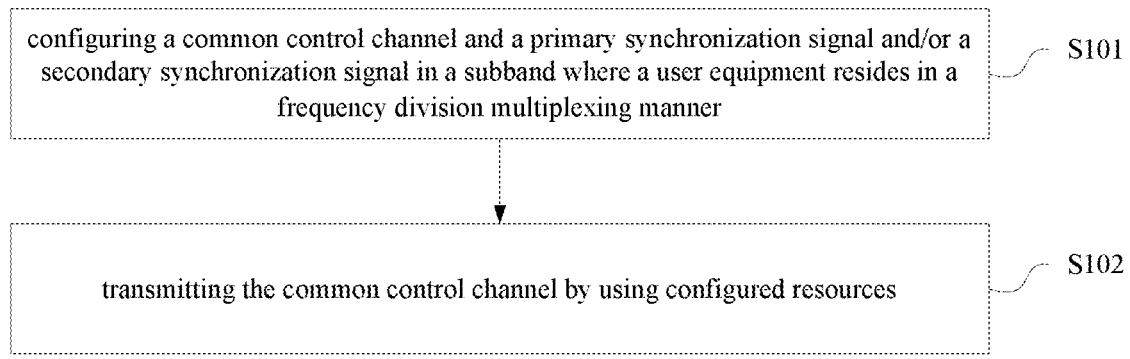
FIG. 1 schematically illustrates a flow diagram of a method for configuring a common control channel according to an embodiment of the present disclosure.

FIG. 1 schematically illustrates a flow diagram of a method for configuring a common control channel according to an embodiment of the present disclosure.

The method for configuring the common control channel of the embodiment is used in a base station side.

It is may be understood that, in a 5G system or other new technology systems, a signal and a channel for detection and cell selection may include a primary synchronization signal, a secondary synchronization signal and a broadcast channel, which may be similar with a primary synchronization signal, a secondary synchronization signal and a broadcast channel in a LTE system or may be different from a design of the channel in Long Term Evolution (LTE) systems; or a different name may be used, which is not limited by the embodiments.

The method for configuring the common control signal includes following steps:

S101: configuring the common control channel and a primary synchronization signal and/or a secondary synchronization signal in a subband where a user equipment resides in a frequency division multiplexing manner; and S102: transmitting the common control channel by using configured resources.

In some embodiment, the subband where the user equipment resides may be a part of a system bandwidth. Specifically, since the system bandwidth is wide, like 5 MHz, so that the user equipment may achieve the purpose for power saving. Broadcast signals and channels in the idle state, namely the primary synchronization signal, the secondary synchronization signal and a physical broadcast channel may be transmitted in the subband where the user equipment resides. The word "subband" in the present disclosure may represent a portion of consecutive frequency resources, and it may also be called bandwidth part and so forth.

Accordingly, in S101, configuring the common control channel and a primary synchronization signal and/or a secondary synchronization signal in a subband where a user equipment resides in a frequency division multiplexing manner. Specifically, when the user equipment resides in the subband, the common control channel also may occupy resources in the subband where the user equipment resides, further, the common control channel may occupy the same symbol with the primary synchronization signal and/or the secondary synchronization signal. For example, the PSS and the SSS occupy two symbols in a time slot, and the common control channel is configured to occupy one or two symbols in the two symbols.

Specifically, the primary synchronization signal and the secondary synchronization signal occupy multiple consecutive physical resource blocks, thus, the common control channel occupies at least one physical resource block around the multiple consecutive physical resource blocks.

Specifically, information in PBCH may indicate the bandwidth of the subband where the user equipment resides, in order that the user equipment resides in the subband. Further, PBCH also may indicate the bandwidth of frequency domain resources occupied by the common control channel, so that the user equipment may detect the common control channel to obtain scheduling information of the common control message. Specifically, since information beard by PBCH is limited, a position of frequency domain resources of the common control channel is relatively fixed.

In some embodiment, in S102, transmitting the common control channel by using configured resources. Since the common control channel multiplexes the same time domain resource (namely the symbol) with the primary synchronization signal and/or the secondary synchronization signal, the common control channel may conduct a transmission in the same beam with the primary synchronization signal and/or the secondary synchronization signal, thereby achieving relatively high resource utilization; and beam sweeping timings, latency of HARQ feedback, and complexity of system design may be reduced.

It needs to be clarified that, the common control channel is one type of a physical downlink control channel, and frequency domain resources occupied by the common control channel are also referred to as a control resource set for the physical downlink control channel or a common control resource set for the physical downlink control channel or a control subband.

In some embodiment, S101 may include following steps: in a frequency domain, the common control channel occupies at least a portion of frequency domain resources other than frequency domain resources occupied by a SS/PBCH block in the subband, and the SS/PBCH block comprises the primary synchronization signal and the secondary synchronization signal.

Figure 2:
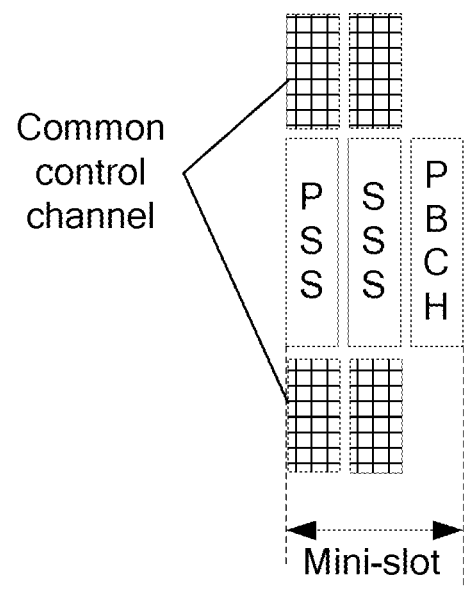
FIG. 2 schematically illustrates an application scenario of the method for configuring the common control channel according to an embodiment of the present disclosure.

In some embodiment, referring to FIG. 2, FIG. 2 schematically illustrates an application scenario of the method for configuring the common control channel according to an embodiment of the present disclosure. As shown in FIG. 2, the subband where the user equipment occupies 24 physical resource blocks. Wherein, the SS/PBCH block includes the PSS, the SSS and the PBCH, and occupies 3 symbols in the time domain, and 12 PRBs in the subband in the frequency domain. Specifically, the PSS and the SSS occupy the first two symbols in the time domain, and 12 PRBs in the subband in the frequency domain; and the PBCH occupies the third symbol and 12 PBRs in the subband in the frequency domain. Therefore, the common control channel may occupy at least a portion of frequency domain resources other than frequency domain resources occupied by the SS/PBCH block. More specifically, the common control signal may conduct the frequency division multiplexing with the PSS and SSS, which occupies at least a portion of resources shown in a shadow part of FIG. 2.

In some embodiment, in the frequency domain corresponding to the symbols occupied by the PSS and SSS, the common control channel may occupy all frequency domain resources other than frequency domain resources occupied by the PSS and the SSS, which are all resources shown in the shadow part of FIG. 2.

Figure 3:
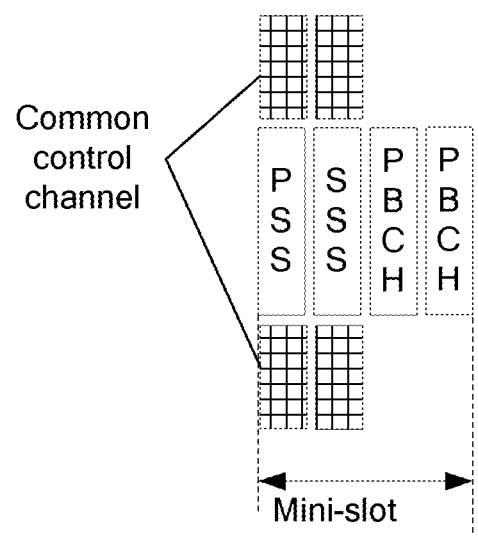
FIG. 3 schematically illustrates another application scenario of the method for configuring the common control channel according to an embodiment of the present disclosure.

In another embodiment of the present disclosure, referring to the FIG. 3, FIG. 3 schematically illustrates another application scenario of the method for configuring the common control channel according to an embodiment of the present disclosure.

In some embodiment, the SS/PBCH block includes the PSS, the SSS and the PBCH, and occupies 4 symbols in the time domain, and 12 PRBs in the subband in the frequency domain. Specifically, the PSS and the SSS occupy the first two symbols in the time domain, and 12 PRBs in the subband in the frequency domain; and the PBCH occupies the third and the fourth symbol, and 12 PBRs in the subband in the frequency domain. Accordingly, the common control channel may occupy at least a portion of frequency domain resources other than frequency domain resources occupied by the SS/PBCH block. More specifically, the common control signal may conduct the frequency division multiplexing with the PSS and the SSS, which are at least occupying a portion of resources shown in a shadow part of FIG. 3.

In some embodiment, S101 may include following steps: in the frequency domain, the common control channel occupies at least a portion of frequency domain resources other than frequency domain resources occupied by the primary synchronization signal and the secondary synchronization signal.

Figure 4:
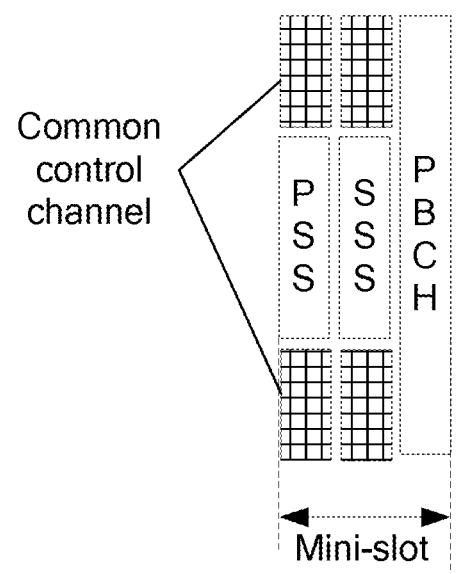
FIG. 4 schematically illustrates another application scenario of the method for configuring the common control channel according to an embodiment of the present disclosure.

In some embodiment, referring to FIG. 4, FIG. 4 schematically illustrates another application scenario of the method for configuring the common control channel according to an embodiment of the present disclosure. In this embodiment, compared with the PSS and the SSS, the PBCH in the SS/PBCH block may occupy more frequency domain resources in the frequency domain.

As shown in FIG. 4, the subband where the user equipment resides occupies 24 physical resource blocks. Wherein, the SS/PBCH block includes the PSS, the SSS and the PSS, and occupies 3 symbols in the time domain, 24 PRBs in the subband in the frequency domain. Specifically, the PSS and the SSS occupy the first two symbols in the time domain, and 12 PRBs in the subband in the frequency domain; and the PBCH occupies the third symbol in the time domain, and 24 PBRs in the subband in the frequency domain. Accordingly, the common control channel may occupy at least a portion of frequency domain resources other than frequency domain resources occupied by the PSS and the SSS, which is at least a portion of resources shown in a shadow part of FIG. 4.

In some embodiment, the common control channel may occupy all frequency domain resources other than frequency domain resources occupied by the PSS and the SSS, which are all resources shown in the shadow part of FIG. 4.

Further, the common control channel is included in the synchronization. Specifically, referring to FIG. 4, when the common control channel occupies at least a portion of frequency domain resources other than frequency domain resources occupied by the primary synchronization signal and the secondary synchronization signal, and the common control channel may be included in the SS/PBCH block.

In some embodiment, S101 may include following steps: in the time domain, configuring the common control channel to occupy the first symbol or the first symbol and the second symbol occupied by the primary synchronization signal and the secondary synchronization signal. Specifically, since the common control channel needs to schedule the user equipment to receive the common control message, the common control channel occupies the first few symbols, and namely occupies the first symbol or the first symbol and the second symbols occupied by the primary synchronization signal and the secondary synchronization signal.

In some embodiment, the method for configuring the common control channel shown in FIG. 1 may include following steps: configuring the common control channel and the SS/PBCH block in the subband where the user equipment resides in the frequency division multiplexing manner.

In some embodiment, the common control channel schedules the user equipment to receive the common control message. For the common control message, its resources occupied in the frequency domain may be resource other than those occupied by the SS/PBCH block in the subband where the user equipment resides, and in the time domain, it may occupy the same symbols with the SS/PBCH block. More specifically, resources occupied by the common control message in the frequency domain may be frequency domain resource other than frequency resource occupied by the SS/PBCH block and the common control channel in the subband where the user equipment resides.

Further, in the time domain, when the synchronization occupies 3 symbols, if the common control channel generally occupies the first symbol in symbols occupied by the SS/PBCH block, the common control message may occupy the second symbol and the third symbol; or if the common control channel generally occupies the first and the second symbols in the symbols occupied by the SS/PBCH block, the common control message may occupy the third symbol. More specifically, a network side may schedule a subset of effective resources in the common control message bearer channel through the common control channel to transmit the common control message.

In some embodiment, the method for configuring the common control channel shown in FIG. 1 may include following steps: configuring the common control channel and the SS/PBCH block in the subband where the user equipment resides in the time division multiplexing manner.

In some embodiment, resources occupied by the common control message and resources occupied by the SS/PBCH block may conduct the time division multiplexing in the subband where the user equipment reside. That is, frequency domain resources occupied by the common control message and frequency domain resources occupied by the SS/PBCH block are the same, and frequency domain resources occupied by the common control message and frequency domain resources occupied by the SS/PBCH block are different (namely occupying different symbols).

Embodiments of the present disclosure achieve different manners of resource configuration for the common control message, and improve flexibility of the configuration of the common control message.

In some embodiment, the method for configuring the common control channel shown in FIG. 1 may include following steps: configuring a mini-slot for the user equipment, and a number of symbols occupied by the mini-slot is a number of symbols occupied by the SS/PBCH block, and a beam used by the mini-slot is a beam used by the SS/PBCH block.

In some embodiment, since the common control is configured with the primary synchronization signal and/or the secondary synchronization signal in the frequency division multiplexing manner, the common control channel conducts the scheduling with the primary synchronization signal and/or the secondary synchronization signal in the same symbol. Since the primary synchronization signal and the secondary synchronization signal are included in the SS/PBCH block, through configuring the mini-slot for the user equipment, and a number of symbols occupied by the mini-slot being a number of symbols occupied by the SS/PBCH block, the user equipment may obtain the common control channel, the primary synchronization signal and the secondary synchronization signal in the mini-slot at the same time, keeping the user equipment from analyzing other resources, increasing resource utilization, and improving the communication efficiency of the user equipment as well.

Referring to the FIG. 2 and FIG. 3, the SS/PBCH block occupies 3 symbols, so that the mini-slot may occupy 3 symbols, and the SS/PBCH block shown in FIG. 4 occupies 4 symbols, so that the mini-slot may occupy 4 symbols. In an embodiment, a time domain unit for scheduling of the user equipment is the mini-slot, thereby preventing the user equipment from conducting the scheduling in the whole time slot (like 12 or 14 symbols), which further increases resource utilization, and improves communication efficiency of the user equipment and the network.

It needs to be cleared that, the number of symbols occupied by the mini-slot and the number of symbols occupied by the SS/PBCH block may be other practical quantities, which is not limited in embodiments of the present disclosure.

In some embodiment, in scheduling information transmitted by the common control channel, a location of the physical resource block occupied by the common control message bearer channel is indicated, or an index of a resource block group occupied by the common control message bearer channel is indicated.

In some embodiment, the common control channel indicates the location of resource occupied by the common control message bearer channel. Specifically, in scheduling information, a location of the physical resource block or an index of the resource block group occupied by the common control message bearer channel may be indicated.

In some embodiment, in scheduling information transmitted by the common control channel, a location of the physical resource block occupied by user equipment dedicated data is indicated, or an index of a resource block group occupied by the user equipment dedicated data is indicated.

In some embodiment, effective resources in the common control message bearer channel are configured to transmit other data except the common control message, which may be the user equipment dedicated data. Therefore, in scheduling information, a location of the physical resource block or an index of the resource block group occupied by the common control message bearer channel may be indicated.

Further, after the user equipment accesses a network, the network indicates resources occupied by the SS/PBCH block to the user equipment, like the number of symbols, so that in the time slot of the SS/PBCH block, the user equipment may determine remain resources in the time slot, like the number of symbols. Accordingly, remaining resources may be scheduled to use, in order to transmit the common control message or the user equipment dedicated data. In other words, the user equipment may receive the common control message and the user equipment dedicated data in remaining resources according to the indication from the common control channel.

It needs to be clarified that, effective resources occupied by the common control channel and effective resources occupied by the common control message are also referred to as a public control block.

In some embodiment, the common control channel may schedule the common control message and the user equipment dedicated data, thereby extending uses of the common control channel, further improving resource utilization.

Figure 5:
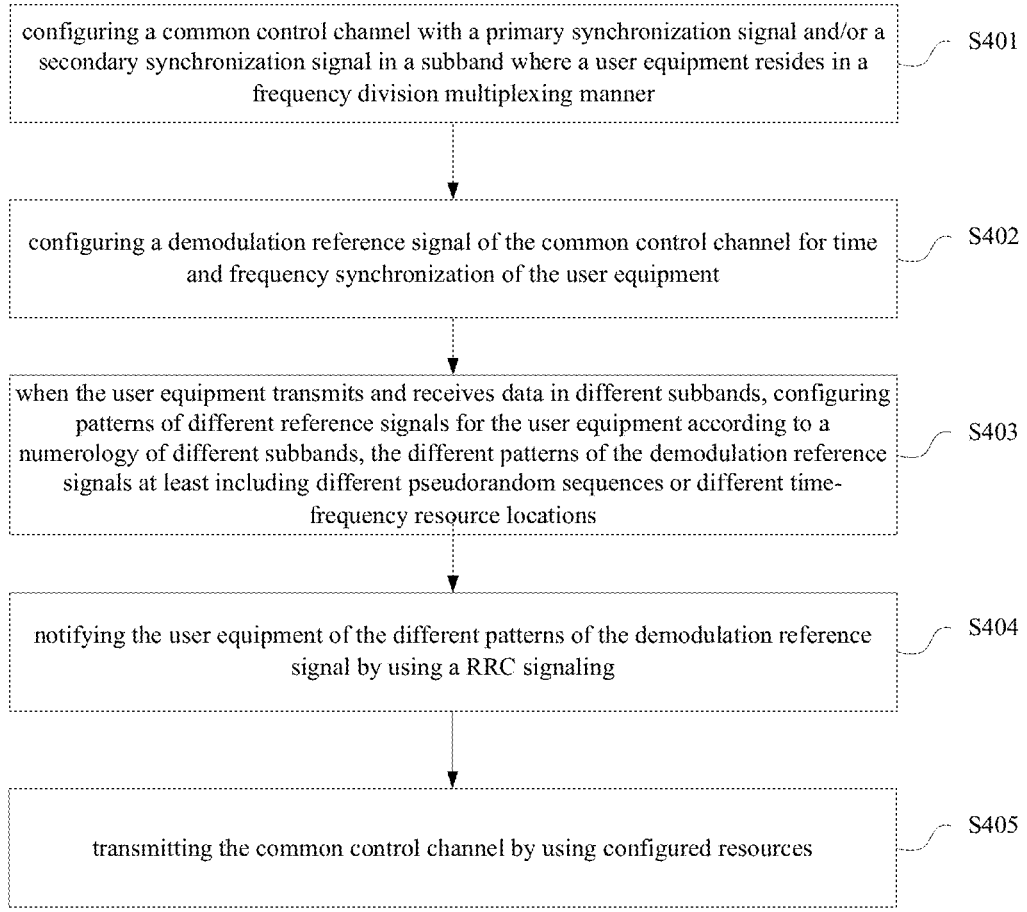
FIG. 5 schematically illustrates a flow diagram of a method for configuring a common control channel according to an embodiment of the present disclosure.

FIG. 5 schematically illustrates another flow diagram of the method for configuring the common control channel according to an embodiment of the present disclosure.

The method for configuring the common control channel includes following steps:

S401: configuring a common control channel and a primary synchronization signal and/or a secondary synchronization signal in a subband where a user equipment resides in a frequency division multiplexing manner;

S402: configuring a demodulation reference signal of the common control channel for time and frequency synchronization of the user equipment;

S403: when the user equipment transmits and receives data in different subbands, configuring different patterns of the demodulation reference signal for the user equipment according to a numerology of different subbands, the different patterns of the demodulation reference signal at least including different pseudorandom sequences or different time-frequency resource locations;

S404: notifying the user equipment of the different patterns of the demodulation reference signal by using a RRC signaling; and S405: transmitting the common control channel by using configured resources.

In some embodiment, details of S401 and S405 may be referred to S101, S102 and the related description in FIG. 2, FIG. 3, FIG. 4, and are not described in detail here.

In some embodiment, S402 may include following steps: configuring an initial value of a pseudorandom sequence for the demodulation reference signal according to a cell identity and a synchronization signal beam identity, which leads to an interference randomization among the demodulation reference signals between different cells or different beams.

Specifically, in order to distinguish different cells and different synchronization signal beams, the initial value of a pseudorandom sequence for the demodulation reference signal is configured to relate to the cell identity and the synchronization signal beam identity. The synchronization signal beam identity is also referred to as a SS/PBCH block index, which leads to the interference randomization between the demodulation reference signals between different cells or different beams. After receiving the demodulation reference signal, the user equipment distinguishes different cells and different synchronization signal beams, in order to conduct a time and frequency synchronization (namely time and frequency tracking).

Further, the user equipment conducts a frequency domain autocorrelation on a channel estimated according to the demodulation reference signal, to obtain time synchronization; and the user equipment conducts a time domain autocorrelation on the channel estimated according to the demodulation reference signal, to obtain frequency synchronization.

It needs to be clarified that, the demodulation reference signal may be the demodulation reference signal, or other practical reference signals which may conduct channel estimation, which is not limited in embodiments of the present disclosure.

Specifically, the user equipment conducts the frequency domain autocorrelation on the channel estimated according to the demodulation reference signal to obtain time synchronization. The user equipment further conducts the time domain autocorrelation on the channel estimated according to the demodulation reference signal to obtain frequency synchronization. Furthermore, the PSS and the SSS also assist the demodulation reference signal to conduct time and frequency synchronization, and the user equipment conducts a cross-correlation on the received PSS/SSS and the local PSS/SSS.

In some embodiment, in S403 and S404, since the network configures the user equipment to transmit and receive data in different subbands, and the numerology of different subbands may be different, the network configures different patterns of the demodulation reference signal for the user equipment in different subbands, and patterns of reference signal are notified to the user equipment by the RRC signaling. Different patterns of the demodulation reference signal at least include different pseudorandom sequences or different time-frequency resource locations.

In some embodiment, the method for configuring the common control channel further configures the demodulation reference signal of the common control channel for beam training, to obtain a reference signal receiving power for a synchronization signal beam. In some embodiment, since the common control channel occupies the same symbol with the primary synchronization signal and the secondary synchronization signal, each symbol allows the user equipment to conduct a training of the base station transmitting beam, so that the user equipment may conduct at least beam training on the common control channel.

In some embodiment, a channel state information reference signal (CSI-RS) is configured for a measurement of a channel quality and a beam tracking (training), and in order to reduce a burden of CSI-RS resource for the beam tracking, demodulating the demodulation reference signal of the common control channel is also configured for the beam tracking.

Further, a quasi-co-location placement port is configured for an antenna of the demodulation reference signal of the common control channel and an antenna of a channel state information reference signal, or a quasi-co-location placement is configured for the antenna of the demodulation reference signal of the common control channel and the antenna of the channel state information reference signal. That is, when the demodulation reference signal of the common control channel conducts beam training, it has the same function with the channel state information reference signal, so that the demodulation reference signal of the common control channel may be transmitted to the user equipment as the channel state information reference signal.

In some embodiment, in order that the demodulation reference signal of the common control channel is configured for beam training of the user equipment, multiple subdivided beams in each synchronization signal beam are configured to correspond to multiple ports of the demodulation reference signal, such that the user equipment measures the demodulation reference signal of the multiple ports, to obtain the reference signal receiving power for the subdivided beam and the reference signal receiving power for the synchronization signal beam.

Specifically, the network side deploys two layers of beams for the synchronization signal beam, where one layer is a synchronization signal beam (also referred to as an initial access beam), which is a wider beam, and the other layer is a thin synchronization signal beam (that is, a subdivided beam), which is a thin beam. For example, a coverage angle of the synchronization signal beam is 60 degrees and a coverage angle of the subdivided beam is 15 degrees. Specifically, the synchronization signal beam includes multiple subdivided beams with continuous angles, so that a port of the demodulation reference signal is configured to correspond to a subdivided beam. Since the demodulation reference signal have multiple ports, multiple subdivided beams correspond to multiple ports of the demodulation reference signal.

Further, a number of the multiple ports may be notified to the user equipment in a physical broadcast channel. Specifically, in order that the user equipment know a port number P of the demodulation reference signal, the network notifies the port number P of the demodulation reference signal to the user equipment in the physical broadcast channel. Specifically, the port number P of the demodulation reference signal may be {1, 2, 4, 8}, so that the physical broadcast channel notifies the port number P of the demodulation reference signal to the user equipment using 2 bits.

In some embodiment, the user equipment averages the measured reference signal receiving power for the subdivided beam corresponding to the multiple ports, to obtain the reference signal receiving power for the synchronization signal beam. Specifically, the user equipment obtains the reference signal receiving power (RSRP) of the corresponding subdivision beam through measuring a port of the demodulation reference signal. Further, after the user equipment knows the port number P of the demodulation reference signal, the user equipment averages the RSRP for the subdivided beam corresponding to the demodulation reference signal of the P ports, to obtain the RSRP for the synchronization signal beam. Furthermore, when the user equipment is in the connected state, the network triggers the user equipment to report the RSRP of the subdivided beam.

Further, the user equipment obtain the RSRP of the synchronization signal beam by the demodulation reference signal measurement, so that the reference signal receiving power for the synchronization signal beam is lower than a set power threshold, the user equipment conduct beam training again. Specifically, since the demodulation reference signal for demodulating the common control channel is configured for beam training of the user equipment, the demodulation reference signal is also configured for a radio link monitoring (RLM); when the RSRP for the synchronization signal beam is lower than the set power threshold, the user equipment determines the link failure and initial a re-access mechanism, that is conducting beam training again.

In some embodiment, each port of the demodulation reference signal of the common control channel may be configured to correspond to adjacent multiple subcarriers. Further, a particular subcarrier right corresponding to the port and two adjacent subcarriers of the particular subcarrier on the common control channel constitute a subcarrier group. One physical resource block includes four subcarrier groups, and corresponds to four ports of the demodulation reference signal.

Specifically, the demodulation reference signal is also configured for channel estimation of each port by the user equipment, and demodulating the common control channel according to a result of channel estimation. Since the port number of the demodulation reference signal may be 8, the transmission scheme of the common control channel may be a transmit diversity scheme up to 8 ports. To simplify the transmit diversity up to 8 ports, the transmit diversity of a frequency division mode is applied, that is a Port A corresponds to a Port A subcarrier and adjacent data subcarriers. Specially, the Port A corresponds to the Port A subcarrier and two adjacent subcarriers. The Port A subcarrier and two adjacent data subcarriers have the same channel, so that the user equipment demodulate two adjacent data subcarriers using the channel estimated by the Port A subcarrier.

Further, the Port A subcarrier and two adjacent data subcarriers constitute the subcarrier group. In a new radio system, a single PRB includes 12 subcarriers, so that the single PRB includes 4 subcarrier groups, and the single PRB corresponds to 1 port or 2 ports, or 4 ports. If one PRB corresponds to 8 ports, two PRBs are required, that is, 8 subcarrier groups are required, corresponding to 8 ports respectively.

Those skilled in the art may understand that, a transmission scheme of a single frequency network (SFN) is applied for the PSS/SSS/PBCH within the SS/PBCH block. The P ports of the demodulation reference signal corresponds to a virtual port, and a virtual port corresponds to a reference signal, and the user equipment only determines a virtual port; or, the P ports of the demodulation reference signal correspond to 2 virtual ports, and a virtual port corresponds to a demodulation signal reference signal, and the user equipment may only determine 2 virtual ports.

Configuring the user equipment to conduct a monitoring of the demodulation reference signal for at least a portion of a frequency of the subband. From the previous embodiment, the demodulation reference signal of the common control channel is configured for time and frequency synchronization and beam training of the user equipment, so that the network configures the user equipment to monitor the demodulation reference signal in the subband where the user equipment resides. Specially, the network configures the user equipment to monitor the demodulation reference signal in any subsets of the frequency of the subband where the user equipment resides.

In embodiments of the present disclosure, the demodulation reference signal of the common control channel is configured so as to conduct time and frequency synchronization, beam training and radio link monitoring, and have various uses, thereby further improving resource utilization.

Embodiments of the present disclosure further provide a method for receiving a common control channel, and the receiving method includes following steps: receiving the common control channel by configured resources, wherein the common control channel conducting a frequency division multiplexing manner with a primary synchronization signal and/or a secondary synchronization signal in a subband where a user equipment resides.

In some embodiment, in a frequency domain, the common control channel occupies at least a portion of frequency domain resources other than frequency domain resources occupied by a SS/PBCH block in the subband. In another way, in the frequency domain, the common control channel occupies at least a portion of frequency domain resources other than frequency domain resources occupied by the primary synchronization signal and the secondary synchronization signal. Further, the common control channel is included in the SS/PBCH block.

The receiving method further includes following steps: receiving a demodulation reference signal of the common control channel, thereby conducting time and frequency synchronization.

The receiving method further includes following steps: receiving the demodulation reference signal of the common control channel, thereby conducting beam training, and obtaining a reference signal receiving power for a synchronization signal beam.

In some embodiment, more details about principles and manners of the method for receiving a common control channel may refer to description in FIG. 1 to FIG. 4, and are not described in detail here.

Figure 6:
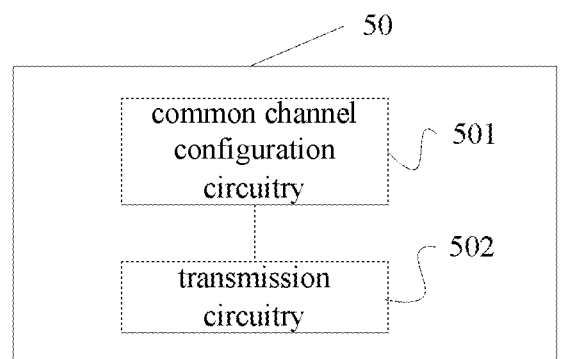
FIG. 6 schematically illustrates a structural diagram of a device for configuring a common control channel according to an embodiment of the present disclosure.

FIG. 6 schematically illustrates a structural diagram of a device for configuring a common control channel according to an embodiment of the present disclosure.

A device for configuring a common control channel 50 shown in FIG. 6 includes a common channel configuration circuitry 501 and a transmission circuitry 502.

The common channel configuration circuitry 501 is configured to configure the common control channel and a primary synchronization signal and/or a secondary synchronization signal in a subband where a user equipment resides in a frequency division multiplexing manner. The transmission circuitry 502 is configured to transmit the common control channel using configured resources.

In some embodiment, the common channel configuration circuitry 501 configures the common control channel and a primary synchronization signal and/or a secondary synchronization signal in a subband where a user equipment resides in a frequency division multiplexing manner. Further, the common control channel may occupy the same symbol with the primary synchronization signal and/or the secondary synchronization signal. Specifically, the primary synchronization signal and the secondary synchronization signal occupy multiple consecutive physical resource blocks, thus, the common control channel occupies at least a physical resource block around the multiple consecutive physical resource blocks.

In some embodiment, the transmission circuitry 502 transmits the common control channel using configured resources. Since the common control channel multiplexes the same time domain resource (namely the symbol) with the primary synchronization signal and/or the secondary synchronization signal, the common control channel may conduct a transmission in the same beam with the primary synchronization signal and/or the secondary synchronization signal, thereby achieving relatively high resource utilization. In this way, beam sweeping timings, latency of HARQ feedback, and complexity of the system design may be reduced.

More details about principles and manners of the transmission circuitry 502 may be referred to description in FIG. 1 to FIG. 4, and are not described in detail here.

Figure 7:
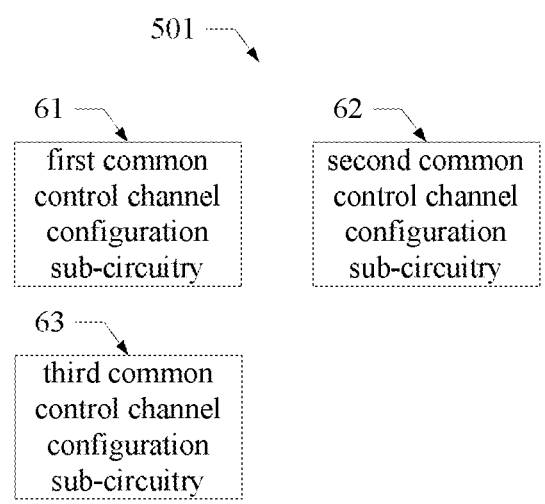
FIG. 7 schematically illustrates a structural diagram of a common channel configuration circuitry shown in FIG. 6.

FIG. 7 schematically illustrates a structural diagram of a common channel configuration circuitry shown in FIG. 6.

As shown in FIG. 7, the common channel configuration circuitry 501 includes a first common control channel configuration sub-circuitry 61, a second common control channel configuration sub-circuitry 62, and a third common control channel configuration sub-circuitry 63.

The first common control channel configuration sub-circuitry 61 is configured to configure the common control channel to occupy at least a portion of frequency domain resources other than frequency domain resources occupied by a SS/PBCH block in the subband in a frequency domain, and the SS/PBCH block includes the primary synchronization signal and the secondary synchronization signal. The second common control channel configuration sub-circuitry 62 is configured to configure the common control channel to occupy at least a portion of frequency domain resources other than frequency domain resources occupied by the primary synchronization signal and the secondary synchronization signal in the frequency domain. Further, the common control channel is included in the SS/PBCH block.

The third common control channel configuration sub-circuitry 63 is configured to configure the common control channel to occupy the first symbol or the first symbol and the second symbol occupied by the primary synchronization signal and the secondary synchronization signal in a time domain.

Embodiments of the present disclosure achieve different manners of resource configuration for the common control channel through the first common control channel configuration sub-circuitry 61, The second common control channel configuration sub-circuitry 62 and the third common control channel configuration sub-circuitry 63, and thereby improving flexibility of the configuration of the common control channel.

Figure 8:
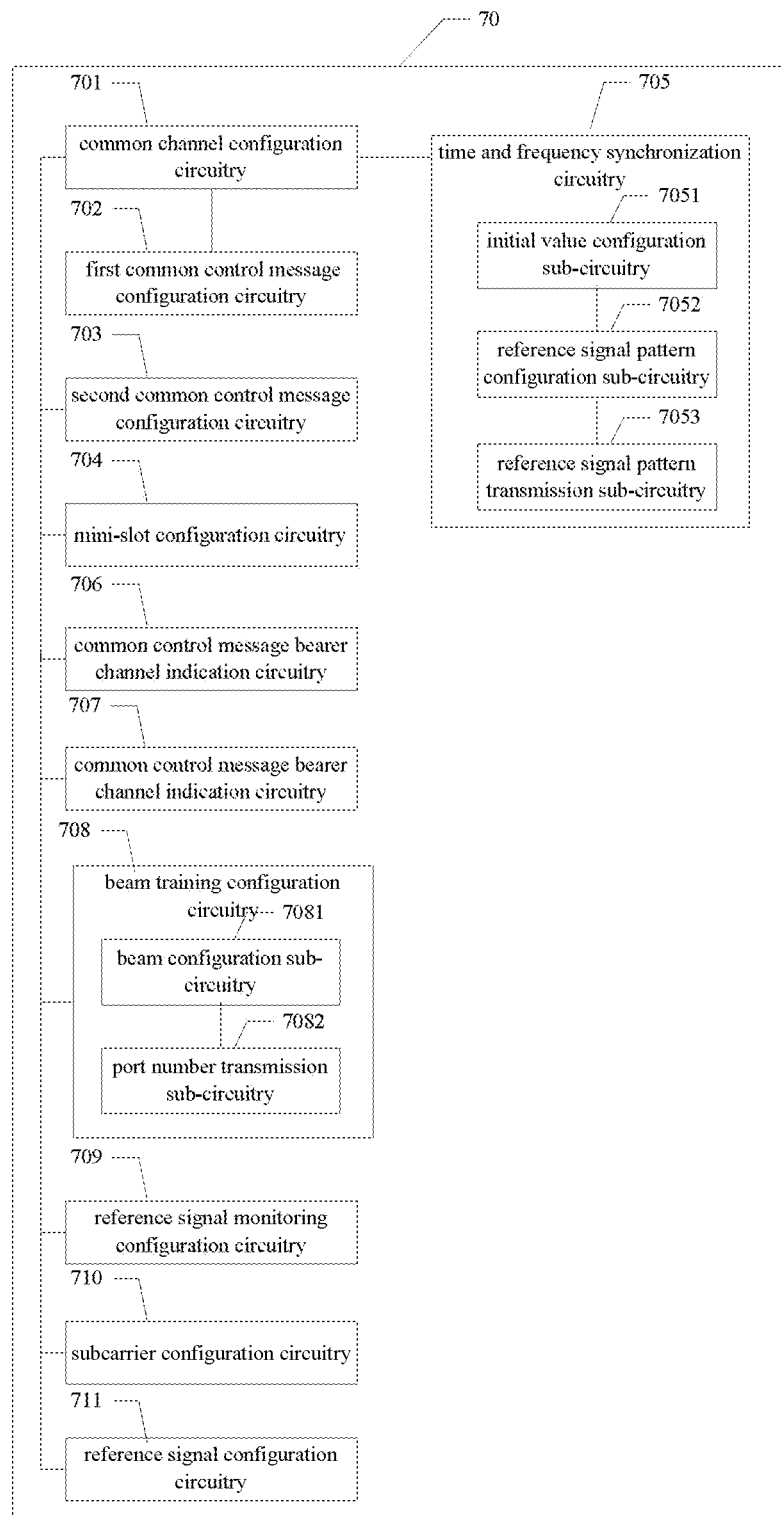
FIG. 8 schematically illustrates another structural diagram of a device for configuring a common control channel according to an embodiment of the present disclosure.

FIG. 8 schematically illustrates another structural diagram of a device for configuring the common control channel according to an embodiment of the present disclosure.

In some embodiment, more details about a common channel configuration circuitry 701 maybe referred to description in FIG. 6 and FIG. 7, and are not described in detail here.

In some embodiment, a device for configuring a common control channel 70 shown in FIG. 8 further includes a first common control message configuration circuitry 702 and a second common control message configuration circuitry 703. The first common control message configuration circuitry 702 is configured to configure the common control channel and the SS/PBCH block in the subband where the user equipment resides in a frequency division multiplexing manner. The second common control message configuration circuitry 703 is configured to configure the common control channel and the SS/PBCH block in the subband where the user equipment resides in a time division multiplexing manner.

Embodiments of the present disclosure achieve different manners of resource configuration for the common control message through the first common control message configuration circuitry 702 and the second common control message configuration circuitry 703, and thereby improving flexibility of the configuration of the common control message.

In some embodiment, the device for configuring a common control channel 70 shown in FIG. 8 further includes a mini-slot configuration circuitry 704. The mini-slot configuration circuitry 704 is configured to configure a mini-slot for the user equipment, and a number of symbols occupied by the mini-slot is a number of symbols occupied by the SS/PBCH block, and a beam used by the mini-slot is a beam used by the SS/PBCH block.

In some embodiment, the device for configuring a common control channel 70 shown in FIG. 8 further includes a common control message bearer channel indication circuitry 706 and a user equipment dedicated data circuitry 707. The common control message bearer channel indication circuitry 706 is configured to indicate a location of a physical resource block occupied by a common control message bearer channel, or indicate an index of a resource block group occupied by the common control message bearer channel in scheduling information transmitted by the common control channel. The user equipment dedicated data circuitry 707 is configured to indicate a location of the physical resource block occupied by user equipment dedicated data, or indicating an index of a resource block group occupied by the user equipment dedicated data, or indicate an index of a resource block group occupied by the user equipment dedicated data.

In some embodiment, the common control channel may schedule the common control message and user equipment dedicated data, thereby extending uses of the common control channel, further improving resource utilization.

In some embodiment, the device for configuring a common control channel 70 further includes a time and frequency synchronization circuitry 705. The time and frequency synchronization circuitry 705 is configured to configure a demodulation reference signal of the common control channel for time and frequency synchronization of the user equipment.

In some embodiment, the time and frequency synchronization circuitry 705 includes: an initial value configuration sub-circuitry 7051 configured to configure an initial value of a pseudorandom sequence for the demodulation reference signal according to a cell identity and a synchronization signal beam identity, which leads to a interference randomization between the demodulation reference signals between different cells or different beams; a reference signal pattern configuration sub-circuitry 7052, which is configured to configure different patterns of the demodulation reference signal for the user equipment according to a numerology of different subbands when the user equipment transmits and receives data in different subbands, wherein different patterns of the demodulation reference signal at least include different pseudorandom sequences or different time-frequency resource locations; and a demodulation reference signal pattern transmission sub-circuitry 7053, configured to notify the user equipment of the different patterns of the demodulation reference signal using a RRC signaling. Specifically, the user equipment conducts a frequency domain autocorrelation on a channel estimated according to the demodulation reference signal, to obtain time synchronization, and conducts a time domain autocorrelation on the channel estimated according to the demodulation reference signal, to obtain frequency synchronization.

In some embodiment, the device for configuring a common control channel 70 further includes beam training configuration circuitry 708, which is configured to configure the demodulation reference signal of the common control channel for beam training, to obtain a reference signal receiving power for a synchronization signal beam.

In some embodiment, beam training configuration circuitry 708 includes: a beam configuration sub-circuitry 7081, configured to configure multiple subdivided beams in each synchronization signal beam to correspond to multiple ports of the demodulation reference signal, such that the user equipment measures the demodulation reference signal of the multiple ports, to obtain the reference signal receiving power for the subdivided beam and the reference signal receiving power for the synchronization signal beam; and a port number transmission sub-circuitry 7082, which is configured to notify a number of the multiple ports to the user equipment in a physical broadcast channel.

In embodiments of the present disclosure, the demodulation reference signal of the common control channel is configured so as to conduct time and frequency synchronization and beam training, and have various uses, and further improve resource utilization.

In some embodiment, the device for configuring a common control channel 70 further includes a reference signal monitoring configuration circuitry 709. The demodulation reference signal monitoring configuration circuitry 709 is configured to configure the user equipment to conduct a monitoring of the demodulation reference signal for at least a portion of a frequency of the subband.

In some embodiment, the device for configuring a common control channel 70 further includes a subcarrier configuration circuitry 710. The subcarrier configuration circuitry 710 is configured to configure each port of the demodulation reference signal of the common control channel to correspond to adjacent multiple subcarriers.

In some embodiment, the device for configuring a common control channel 70 further includes a reference signal configuration circuitry 711. The demodulation reference signal configuration circuitry 711 is configured to configure a quasi-co-location placement port for an antenna of the demodulation reference signal of the common control channel and an antenna of a channel state information reference signal, or configure a quasi-co-location placement for the antenna of the demodulation reference signal of the common control channel and the antenna of the channel state information reference signal.

More details about the device for configuring a common control channel 70 maybe referred to description in FIG. 1 to FIG. 7, and are not described in detail here.

Embodiments of the present disclosure further provide a device for receiving a common control channel, which includes a common control channel receiving circuitry (not shown in any figures). The common control channel receiving circuitry receives the common control channel by configured resources, wherein the common control channel conducts a frequency division multiplexing manner with a primary synchronization signal and/or a secondary synchronization signal in a subband where a user equipment resides.

In some embodiment, in a frequency domain, the common control channel occupies at least a portion of frequency domain resources other than frequency domain resources occupied by a SS/PBCH block in the subband. In another way, in the frequency domain, the common control channel occupies at least a portion of frequency domain resources other than frequency domain resources occupied by the primary synchronization signal and the secondary synchronization signal. Further, the common control channel is included in the SS/PBCH block.

In some embodiment, the receiving method further includes a first demodulation reference signal receiving circuitry (not shown in any figures). The first demodulation reference signal receiving circuitry receives a demodulation reference signal of the common control channel, thereby conducting time and frequency synchronization.

In some embodiment, the receiving method further includes a second demodulation reference signal receiving circuitry (not shown in any figures). The second demodulation reference signal receiving circuitry receives the demodulation reference signal of the common control channel, thereby conducting beam training, and obtaining a reference signal receiving power for a synchronization signal beam.

In some embodiment, more details about principles and manners of the device for receiving a common control channel maybe referred to description in FIG. 1 to FIG. 7, and it are not described in detail here.

Those skilled in the art may understand that all or part of steps of above methods may be completed by relevant hardware once the program instruction are executed, and the program may be storage in a computer readable storage medium, such as a Read-Only memory (ROM), a Random Access Memory (RAM), a magnetic disk or an optical disk.

What is claimed is:

1. A method for configuring a common control channel, comprising:

configuring a common control channel and a primary synchronization signal and/or a secondary synchronization signal in a subband where a user equipment resides in a frequency division multiplexing manner;

configuring a quasi-co-location placement port for an antenna of a demodulation reference signal of the common control channel and an antenna of a channel state information reference signal, or configuring a quasi-co-location placement for the antenna of the demodulation reference signal of the common control channel and the antenna of the channel state information reference signal; and transmitting the common control channel by using configured resources.

2. The method according to claim 1, wherein configuring the common control channel and the primary synchronization signal and/or the secondary synchronization signal in the subband where the user equipment resides in the frequency division multiplexing manner comprises:

in a frequency domain, the common control channel occupying at least a portion of frequency domain resources other than frequency domain resources occupied by a SS/PBCH block in the subband, wherein the SS/PBCH block comprises the primary synchronization signal and the secondary synchronization signal.

3. The method according to claim 1, wherein configuring the common control channel and the primary synchronization signal and/or the secondary synchronization signal in the subband where the user equipment resides comprises:

in the frequency domain, the common control channel occupying at least a portion of frequency domain resources other than frequency domain resources occupied by the primary synchronization signal and the secondary synchronization signal.

4. The method according to claim 3, wherein the common control channel is comprised in the SS/PBCH block.

5. The method according to claim 1, wherein configuring the common control channel and the primary synchronization signal and/or the secondary synchronization signal in the subband where the user equipment resides in the frequency division multiplexing manner comprises:

in a time domain, configuring the common control channel to occupy a first symbol or the first symbol and the second symbol occupied by the primary synchronization signal and the secondary synchronization signal.

6. The method according to claim 1, further comprising:

configuring a mini-slot for the user equipment, wherein a number of symbols occupied by the mini-slot is a number of symbols occupied by the SS/PBCH block, and a beam used by the mini-slot is a beam used by the SS/PBCH block.

7. The method according to claim 1, further comprising:

in scheduling information transmitted by the common control channel, indicating a location of a physical resource block occupied by a common control message bearer channel, or indicating an index of a resource block group occupied by the common control message bearer channel.

8. The method according to claim 1, further comprising:

in scheduling information transmitted by the common control channel, indicating a location of the physical resource block occupied by user equipment dedicated data, or indicating an index of a resource block group occupied by the user equipment dedicated data.

9. The method according to claim 1, further comprising:

configuring the demodulation reference signal of the common control channel for time and frequency synchronization of the user equipment.

10. The method according to claim 9, wherein configuring the demodulation reference signal of the common control channel for time and frequency synchronization of the user equipment comprises:

configuring an initial value of a pseudorandom sequence for the demodulation reference signal according to a cell identity and a synchronization beam identity, to cause an interference randomization among the demodulation reference signals between different cells or different synchronization beams.

11. The method according to claim 10, wherein the user equipment conducts a frequency domain autocorrelation on a channel estimated according to the demodulation reference signal, to obtain time synchronization; and conducts a time domain autocorrelation on the channel estimated according to the demodulation reference signal, to obtain frequency synchronization.

12. The method according to claim 1, further comprising:

configuring the demodulation reference signal of the common control channel for beam training of the user equipment, to obtain a reference signal receiving power for a synchronization signal beam.

13. The method according to claim 12, wherein configuring the demodulation reference signal of the common control channel for beam training comprises:

configuring multiple subdivided beams in each synchronization signal beam to correspond to multiple ports of the demodulation reference signal, so that the user equipment measures the demodulation reference signal of the multiple ports, to obtain the reference signal receiving power for the subdivided beam and the reference signal receiving power for the synchronization signal beam.

14. The method according to claim 13, wherein the user equipment averages the measured reference signal receiving power of the subdivided beam corresponding to multiple ports, to obtain the reference signal receiving power for the synchronization signal beam.

15. The method according to claim 13, wherein prior to configuring multiple subdivided beams in each synchronization signal beam to correspond to multiple ports of the demodulation reference signal, the method further comprises:

notifying a number of the multiple ports to the user equipment in a physical broadcast channel.

16. The method according to claim 13, wherein when the reference signal receiving power of the synchronization signal beam is lower than a predetermined power threshold, the user equipment conducts beam training again.

17. The method according to claim 12, wherein the method further comprises:

configuring the user equipment to conduct monitoring of the demodulation reference signal for at least a portion of frequency in the subband.

18. The method according to claim 1, further comprising:

configuring each port of the demodulation reference signal of the common control channel to correspond to a plurality of adjacent subcarriers.

19. The method according to claim 18, wherein a particular subcarrier right corresponding to the port and two adjacent subcarriers of the particular subcarrier on the common control channel constitute a subcarrier group, and one physical resource block includes four subcarrier groups, and corresponds to four ports of the demodulation reference signal.

* * * * *